United States Patent
Lentine et al.

(10) Patent No.: US 7,161,964 B2
(45) Date of Patent: Jan. 9, 2007

(54) RECONFIGURABLE ADD/DROP, MULTIPLEXER/DEMULTIPLEXER USING A TRANSCEIVER WITH LOOP-BACK FUNCTION

(75) Inventors: Anthony L. Lentine, Holmdel, NJ (US); Graham H. Smith, Jersey City, NJ (US); Ted K. Woodward, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 945 days.

(21) Appl. No.: 10/241,232

(22) Filed: Sep. 11, 2002

(65) Prior Publication Data
US 2004/0047371 A1    Mar. 11, 2004

(51) Int. Cl.
*H04J 3/04* (2006.01)
(52) U.S. Cl. .......................... 370/535; 398/35
(58) Field of Classification Search ............... 370/535, 370/536, 537, 538, 542, 389, 358, 395.53; 398/45, 35, 14, 20, 135
See application file for complete search history.

(56) References Cited

U.S. PATENT DOCUMENTS
6,690,682 B1 * 2/2004 Giaretta et al. ............. 370/535

FOREIGN PATENT DOCUMENTS
EP     1 146 681 A2 *  3/2001

OTHER PUBLICATIONS

Vitesse Semiconductor Corp, Preliminary Datasheet VSC7139—20 pgs.

* cited by examiner

*Primary Examiner*—Chi Pham
*Assistant Examiner*—Alexander O. Boakye

(57) ABSTRACT

A reconfigurable ADD/DROP multiplexer/demultiplexer apparatus is implemented by connecting a multiplexer/demultiplexer apparatus to a serializer/deserializer (SERDES) apparatus having a loop-back capability. By selectively activating the loop-back functionality of the SERDES apparatus the combination can be made to function as a reconfigurable ADD/DROP multiplexer/demultiplexer apparatus.

13 Claims, 10 Drawing Sheets

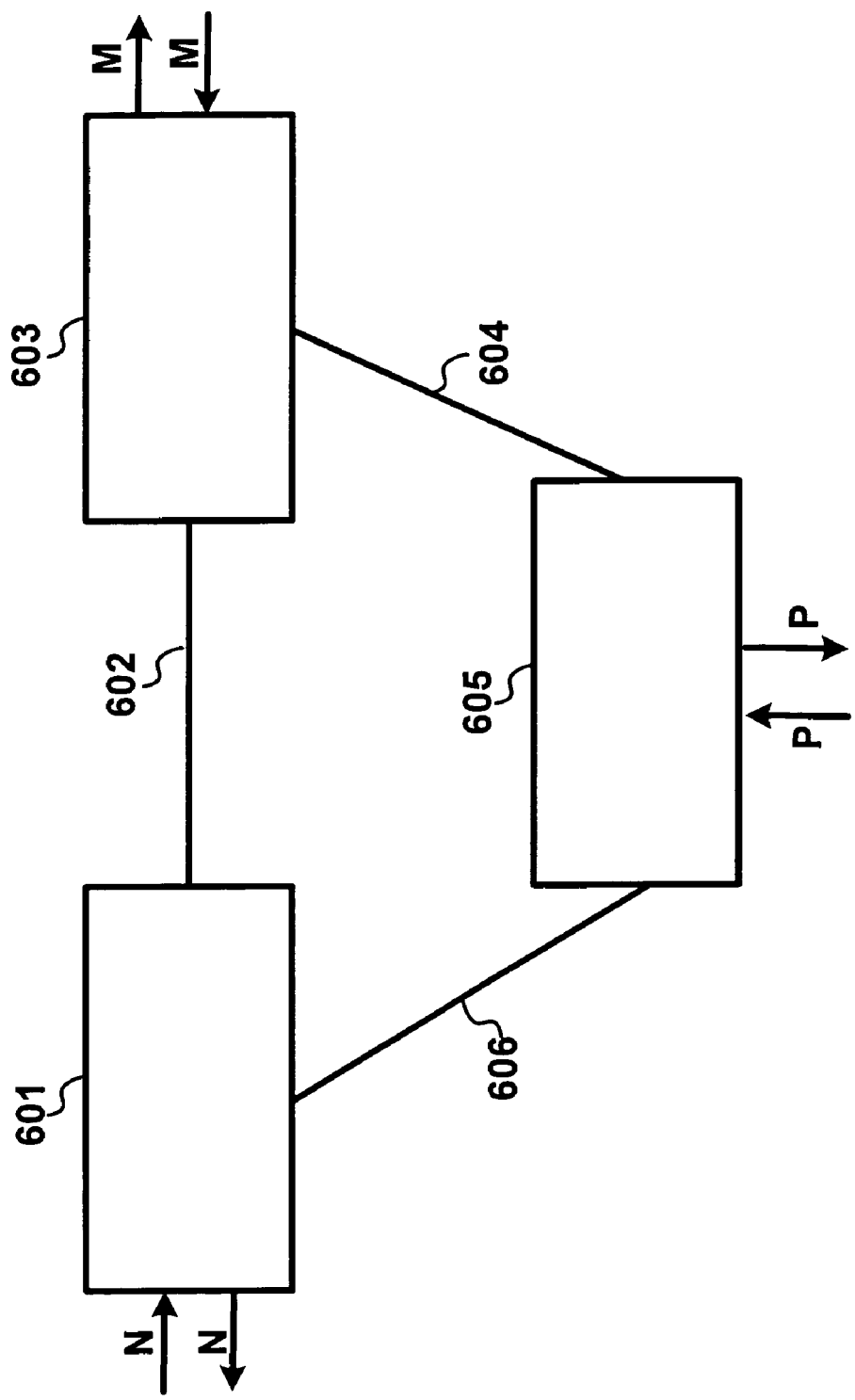

RECONFIGURABLE ADD/DROP, MULTIPLEXER/DEMULTIPLEXER USING A TRANSCEIVER WITH LOOP-BACK FUNCTION

TECHNICAL FIELD OF THE INVENTION

This invention relates to a reconfigurable ADD/DROP multiplexer/demultiplexer, and more particularly, to a reconfigurable ADD/DROP multiplexer/demultiplexer apparatus and method utilizing a transceiver having a loop-back capability.

BACKGROUND OF THE INVENTION

ADD/DROP multiplexers (ADMs) are used in three major applications. The first is for time-division multiplexed (TDM) systems that can be made with electronic time-division multiplexed (TDM) circuits or implemented using optical techniques, namely optical time-division multiplexed (OTDM) circuits. The second application is for wavelength-division multiplexed (WDM) systems which are operated in optical systems incorporating optical fiber or free-space as the optical transmission medium. The third application is in space-division multiplexing (SDM) systems, where different channels are transmitted between the same source and destination, but the transmission is via alternate paths (e.g., multiple fibers in an optical network). In the prior art, additional dedicated switching apparatus was used to provide the reconfiguration ADM function. For example, in TDM systems, an electronic switch fabric is placed between the low-rate and fast-rate ports. In OTDM systems, an optical channel selector is placed between the low rate and fast-rate ports. In WDM systems, optical filters or switching fabrics can be used, or Mux/Demux of the wavelength channels is performed, the signals converted from optical-to-electrical-to-optical with a switching fabric included in the electrical circuitry. For the SDM systems, the optical signals are converted to electrical, switched electronically and then converted back to optics (all signals remaining at a low-rate).

There is a continuing need to reduce the number of components, size, and complexity of reconfigurable ADMs. What is desired is a lower-cost, higher-volume reconfigurable multiplexer/demultiplexer apparatus that can provide multiplexer/demultiplexer or ADD/DROP multiplexer functionalities.

SUMMARY OF THE INVENTION

In accordance with the present invention, we have recognized that a reconfigurable ADD/DROP multiplexer/demultiplexer apparatus can be implemented by combining a multiplexer/demultiplexer apparatus with a serializer/deserializer (SERDES) apparatus having a loop-back capability. By selectively activating the loop-back functionality of the SERDES apparatus using PASS or ADD/DROP control signals, the combination can be made to function as a reconfigurable ADD/DROP multiplexer/demultiplexer apparatus which can PASS or ADD/DROP signals, respectively.

Our reconfigurable ADD/DROP multiplexer/demultiplexer apparatus includes the standard elements that would be required to construct a point-to-point bi-directional communication system that multiplexes N client input ports to a single network output port, and performs the inverse operation on received network signals. The unique feature of the apparatus is that it makes use of a commonly employed diagnostic feature of one of the elements of such a system, the serializer-deserializer (SERDES) device typically present on each of the individual client input/output (I/O) ports. In a uni-directional system (e.g having a single network TX and network RX port), the function is immediately realized without the need for functional elements beyond those used in a point to point configuration.

In a bi-directional configuration, there are four network ports on the apparatus, and so operation is more complex than a point-to-point configuration. Nevertheless, the loop-back functionality of the SERDES enables a simpler and more cost-effective realization of the bi-directional ADD/DROP node than could be done without it.

In the simplest embodiment, our unidirectional add/drop multiplexer consists of a network receive port into which a serial signal stream is imposed. The serial stream consists of a single logical channel from a single user. The signal must typically be imposed on a serializer/deserializer device (SERDES) prior to performing more complex logic functions, because complex logic operations are generally performed more conveniently on signals one byte at time, instead of one bit at a time. The SERDES device is employed to present an entire byte of information on relatively wide array of parallel lines (the data bus) to more complex logic operations. This represents the 'DROP' or 'OUTPUT' side of the data link. SERDES devices are typically bi-directional, and perform the same operation in reverse on a parallel array of input signals, serializing them to a single output line, in preparation to be imposed a network transmission port. A convenient diagnostic feature of many SERDES devices is a so-called 'loopback' capability, making it possible to connect either the serial input to the serial output of the SERDES, or the parallel input to the parallel output of the SERDES. In this example, were the parallel input of the SERDES to be connected to the parallel output of the SERDES, the apparatus has effected the connection of the OUTPUT side of the data link to the INPUT side of the data link. This corresponds to a CONTINUE or 'EXPRESS' operation (hereinafter PASS mode) in a unidirectional ring network.

Were the SERDES to be left in it's normal, or non-loopback mode, received network traffic is expressed to the bi-directional port connected to the apparatus and data is added or dropped from the link.

In this example, we considered a single logical channel present on the network link. Operation is richer and of greater practical relevance when network traffic consists of multiple channels that are multiplexed onto the network link either optically or electrically. In a time-division multiplexed (TDM) transmission link, we may consider the link as broken into a number of logical time slots, each of which contains a channel of the type described. After performing an initial phase of demultiplexing to expose serial data streams, each of which consists of an individual logical channel (e.g. all bits are part of the same signal), the SERDES operation is required to again obtain byte-wide signals. Once again, each SERDES can be selectively placed into loopback, thereby permitting each individual channel to be either expressed (continued) or added and dropped at an individual node. In this fashion, a multi-channel ADD/DROP can be realized.

In a bi-directional configuration, operation is entirely similar, but for the complication that a drop-side signal is typically processed entirely in one direction, while express traffic traverses the node from one side (EAST), to the other (WEST). This requires a cross-over connection, easily realized in programmable logic devices typically already present for performance monitoring and other functions.

More specifically, our reconfigurable ADD/DROP demultiplexer/multiplexer apparatus comprises a demultiplexer/multiplexer including a demultiplexer for receiving a first multiplexed signal which is demultiplexed into a first demultiplexed signal and a multiplexer for receiving a second demultiplexed signal which is multiplexed into a second multiplexed signal and a serializer/deserializer apparatus including first converter means for receiving the first demultiplexed signal which is which is converted to an output signal and second converter means for receiving an input signal which is converted into the second demultiplexed signal, and reconfiguration means responsive to one or more control signals selected from a group including (1) a PASS control signal for selecting one or more signal components of the first demultiplexed signal to be looped-back to become selected one or more signal components of the second demultiplexed signal, (2) a DROP control signal for selecting one or more signal components of the first demultiplexed signal to be dropped and outputted as corresponding one or more signal components of the third multiplexed signal, and (3) an ADD control signal for selecting one or more signal components of the fourth multiplexed signal to be added as corresponding one or more signal components of the second demultiplexed signal.

The reconfigurable ADD/DROP demultiplexer/multiplexer apparatus may be utilized with TDM, OTDM, or WDM type multiplexed signals.

Our method of operating a reconfigurable ADD/DROP demultiplexer/multiplexer apparatus comprises the steps of:
at a demultiplexer/multiplexer
demultiplexing a first multiplexed signal into a first demultiplexed signal and
multiplexing a second demultiplexed signal into a second multiplexed signal and
at a serializer/deserializer apparatus
converting the first demultiplexed signal into an output signal,
converting an input signal into the second demultiplexed signal, and wherein
the serializer/deserializer apparatus is responsive to one or more control signals selected from a group including (1) a PASS control signal selecting one or more signal components of the first demultiplexed signal which are looped-back as one or more components of the second demultiplexed signal, (2) a DROP control signal selecting one or more signal components of the first demultiplexed signal to be dropped and outputted as corresponding one or more signal components of the third multiplexed signal, and (3) an ADD control signal selecting one or more signal components of the fourth multiplexed signal to be added as corresponding one or more signal components of the second demultiplexed signal.

BRIEF DESCRIPTION OF THE DRAWINGS

In the drawings,

FIG. 6 shows a loop communication system including a plurality of reconfigurable ADD/DROP multiplex/demultiplex apparatuses connected over a loop facility.

In the following description, identical element designations in different figures represent identical elements. Additionally in the element designations, the first digit refers to the figure in which that element is first located (e.g., 102 is first located in FIG. 1).

DETAILED DESCRIPTION

Figure 1A:
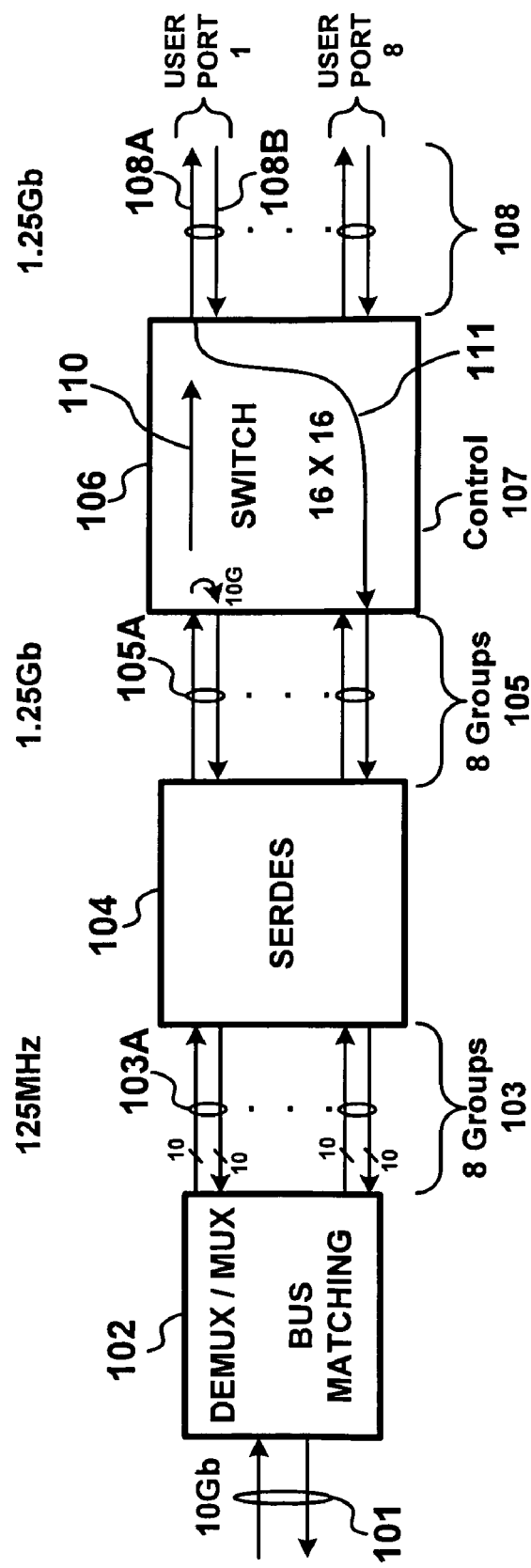
FIG. 1A shows a prior art embodiment of a reconfigurable ADD/DROP multiplexer/demultiplexer apparatus.

With reference to FIG. 1A there is shown a prior art embodiment of a reconfigurable ADD/DROP demultiplexer/multiplexer apparatus. An illustrative 10 Gb/s optical signal is carried by bus pair 101 to/from an input/output port pair of demultiplexer/multiplexer apparatus 102. The demultiplexer/multiplexer apparatus 102 converts the 10 Gb/s optical signal into eight 1.25 Gb/s optical signals on bus pairs 103. The bus pair 103A includes ten bit wide input bus and ten bit wide output bus (standard GbE parallel interface), each lead of the input bus and output bus operating at a 125 Mhz electrical signal rate. Each 1.25 Gb/s optical signal is a gigabit Ethernet signal (GbE) presented in the standard GbE parallel interface using a ten bit wide bus The output demultiplexer/multiplexer apparatus 102 also provides a bus matching function which matches the protocol of the 10 Gb/s optical signal to the 125 Mhz electrical signal on the ten bit wide input and output buses 103A. The well-known demultiplexer/multiplexer apparatus 102 includes a first stage Demux/Mux unit (not shown) and a logical processing unit (not shown). The first stage Demux/Mux unit converts the 10 Gb/s signal to/from 622 Mb/s signals appearing on 8 groups of 16-bit wide bus pairs. The logical processing unit converts the 622 Mb/s signals on the 8 groups of 16-bit wide bus pairs to/from the 125 Mb/s signals on the 8 groups of ten bit wide bus pairs 103.

A serializer/deserializer apparatus 104 (also referred to herein as a SERDES apparatus) connects via bus group 103 to demultiplexer/multiplexer apparatus 102. A SERDES apparatus 104 converts each pair of ten bit wide input and output buses 103A into a single 1.25 Gb/s signal on bus pair 105A. This result in a group 105 of eight 1.25 Gb/s bus pairs 105A. The eight 1.25 Gb/s bus pairs 105 connect to a 16×16 switch fabric 106.

The switch unit 106 can switch any of the 8-input/output bus pairs 105 to any of the user ports 1–8 in response to a control signal 107. In response to a PASS control signal 107, switch 106 can "pass," 109, any 1.25 Gb/s signal on input bus of bus pair 105A through to its corresponding output bus. In response to a DROP control signal 107, switch 106 can selectively "drop," 110, a received 1.25 Gb/s signal 108A to user port 1 and "add," 111, a new transmit signal 108B from user port 1. In this manner, the ADD/DROP apparatus of FIG. 1A is able to provide a reconfigurable ADD/DROP and PASS signal switching capability.

Figure 1B:
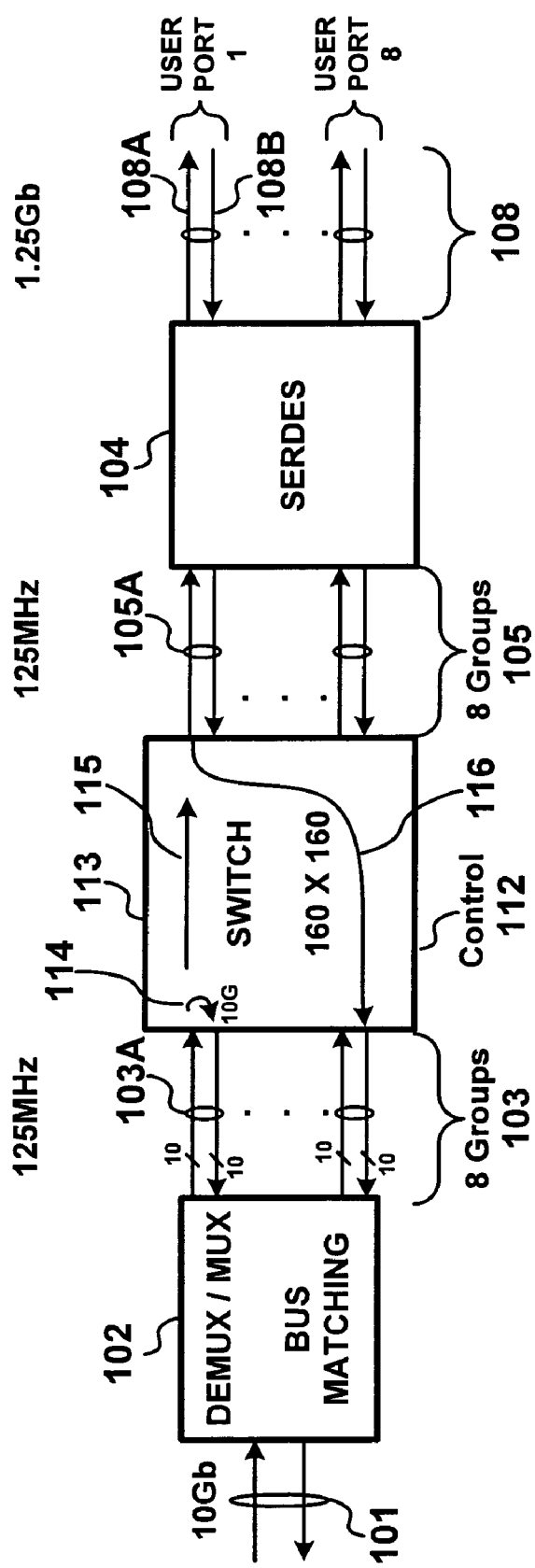
FIG. 1B illustratively shows another prior art embodiment of a reconfigurable ADD/DROP multiplexer/demultiplexer apparatus.

With reference to FIG. 1B there is shown another prior art embodiment of an ADD/DROP apparatus. An illustrative 10 Gb/s signal bus pair 101 is connected to a first input/output port pair of demultiplexer/multiplexer apparatus 102. The demultiplexer/multiplexer apparatus 102 converts the 10 Gb/s signal bus pair 101 into eight 1.25 Gb/s signal bus pairs 103. Each 1.25 Gb/s signal bus pair 103A includes ten bit wide input and output buses, each lead of the input bus and output bus operating at a 125 Mhz signal rate. As discussed before, output demultiplexer/multiplexer apparatus 102 also provides a bus matching function which matches the protocol of the 10 Gb/s signal bus pair 101 to the 125 Mhz rate of the ten bit wide input and output buses 103A.

In response to a PASS control signal 112A, the 160×160 switch fabric 113 can "pass," 114, the signals on any ten bit wide input bus of a bus pair, e.g., 103A, through to its corresponding output bus of bus pair 103A. In response to a DROP control signal 112, the switch fabric 113 can selectively "drop" a received signal, 115, on a ten bit wide input bus of a bus pair, e.g., 103A, to a ten bit wide output bus of a bus pair, e.g., 105A, and "add" a new transmit signal, 116, from a ten bit wide input bus of a bus pair 105A. In this manner, the ADD/DROP apparatus of FIG. 1B is used to provide an ADD/DROP and PASS signal switching capability for each of the ten bit wide bus pairs, e.g., 103A, of bus group 103.

Each of the ten bit wide bus pairs, e.g., 105A, of bus group 105 connect to a SERDES apparatus 104. As described previously, the SERDES apparatus 104 converts the 125 MHz signals on the input/output ten bit wide bus pairs 105 to/from the 1.25 Gb/s signal on the input/output bus pair 108. This result in a group 108 of eight 1.25 Gb/s bus pairs which connect to the eight user ports.

Thus, each of the reconfigurable ADD/DROP apparatus arrangements of FIGS. 1A and 1B require using a multiplexer/demultiplexer apparatus, a SERDES apparatus, and a switch apparatus. We have recognized that the loop-back functions that are used for the maintenance and test features of a SERDES apparatus can be also used to provide the switching capability requires for a reconfigurable ADD/DROP multiplexer/demultiplexer apparatus. Thus, in accordance with the present invention, a reconfigurable ADD/DROP multiplexer/demultiplexer apparatus is implemented using only a SERDES apparatus connected to a multiplexer/demultiplexer apparatus. By selectively activating the loop-back functionality of the SERDES apparatus our ADD/DROP multiplexer/demultiplexer apparatus can be made reconfigurable by selectively dropping/adding or passing channels.

Figure 2A:
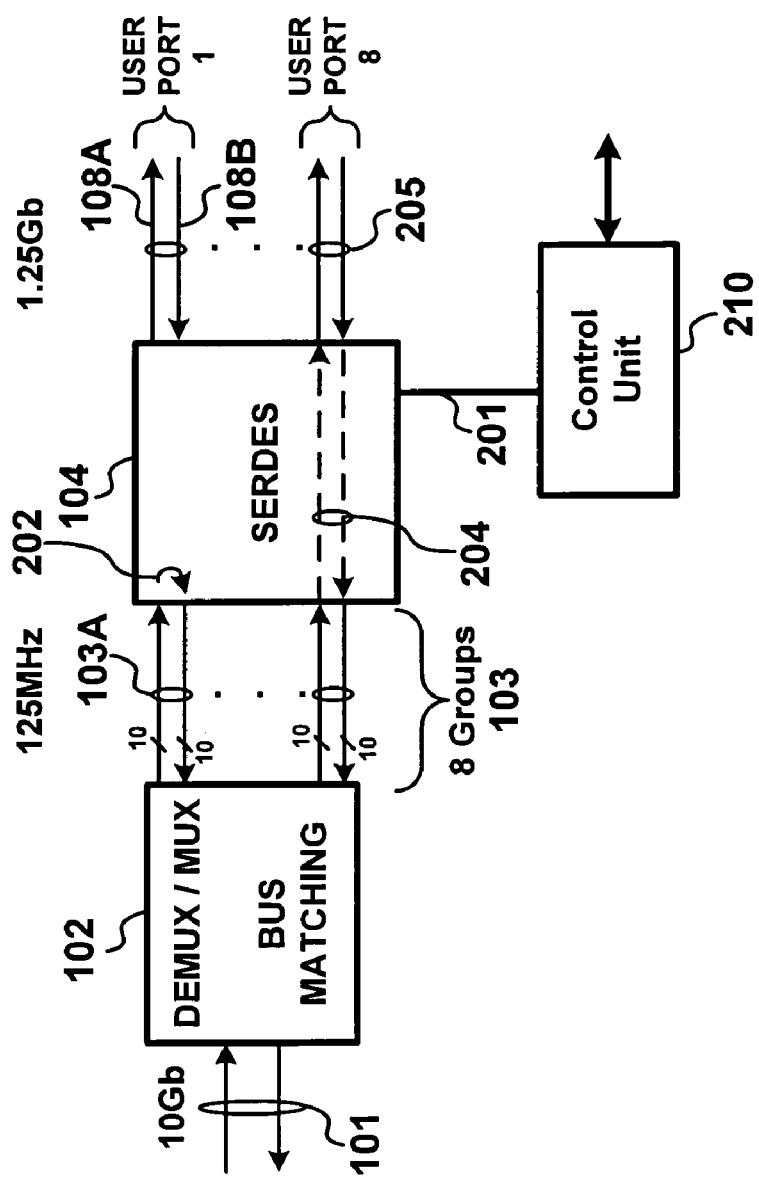
FIG. 2A shows, in accordance with the present invention, an illustrative reconfigurable ADD/DROP multiplexer/demultiplexer apparatus which uses a multiplexer/demultiplexer and SERDES apparatus combination, where the loopback functionality of the SERDES apparatus is used to select the ADD/DROP and PASS channels of the reconfigurable ADD/DROP apparatus.

FIG. 2A shows our illustrative reconfigurable ADD/DROP multiplexer/demultiplexer apparatus, which uses only a multiplexer/demultiplexer 102 and SERDES apparatus 104 combination. In FIG. 2A, our reconfigurable ADD/DROP apparatus uses the multiple-lead bus loop-back function of the SERDES apparatus 104 to select the ADD/DROP and PASS channels. While the present invention is described herein for use with gigabit Ethernet optical signals, it can also be utilized with Fiber channel optical signals.

The demultiplexer/multiplexer apparatus 102 operates in the manner previously described in FIGS. 1A and 1B. The illustrative 10 Gb/s signal bus pair 101 connects to a first input/output port pair of demultiplexer/multiplexer apparatus 102. The demultiplexer/multiplexer apparatus 102 converts the 10 Gb/s signal on bus pair 101 into eight 1.25 Gb/s signals on bus pairs 103. Each 1.25 Gb/s signal bus pair 103A includes ten bit wide input and output buses, each lead of the input and output buses operating at a 125 Mhz signal rate. The output demultiplexer/multiplexer apparatus 102 also provides a bus matching function which matches the protocol of the 10 Gb/s signal bus pair 101 to the 125 Mhz rate of the ten bit wide input and output buses 103A.

The SERDES apparatus 104 connects via bus group 103 to demultiplexer/multiplexer apparatus 102. The SERDES apparatus 104 converts each of the 10-bit wide input and output buses 103A into a single 1.25 Gb/s bus pair 108A, 108B. This result in a group 108 of eight 1.25 Gb/s bus pairs. In addition to this bus conversion function, the SERDES apparatus 104 is used as switch fabric. By selectively activating the maintenance and test features, via control leads 201, the SERDES apparatus 104 can also be utilized as a switch fabric. Using a PASS control signal 201 the SERDES apparatus 104 operates to switch or PASS the signals 202 on any ten bit wide input bus of bus pair, e.g., 103A, through to its corresponding output ten bit wide bus. In response to a DROP/ADD control signal 201, the SERDES apparatus 104 can selectively "drop" a received 1.25 Gb/s signal 204 received on the ten bit wide input bus of bus pair, e.g., 203, to a ten bit wide output bus 205 to user port 8 and "ADD" a new transmit signal 204 from ten bit wide input bus of bus pair 205 from user port 8. The control signal 201 is obtained from control unit 210 which may be managed locally or remotely (e.g., over separate signaling channel or over a GbE signaling channel). In this manner, our reconfigurable ADD/DROP apparatus of FIG. 2A is used to provide an ADD/DROP and PASS signal switching capability for each of the of ten bit wide bus pairs of bus group 103.

Figure 2B:
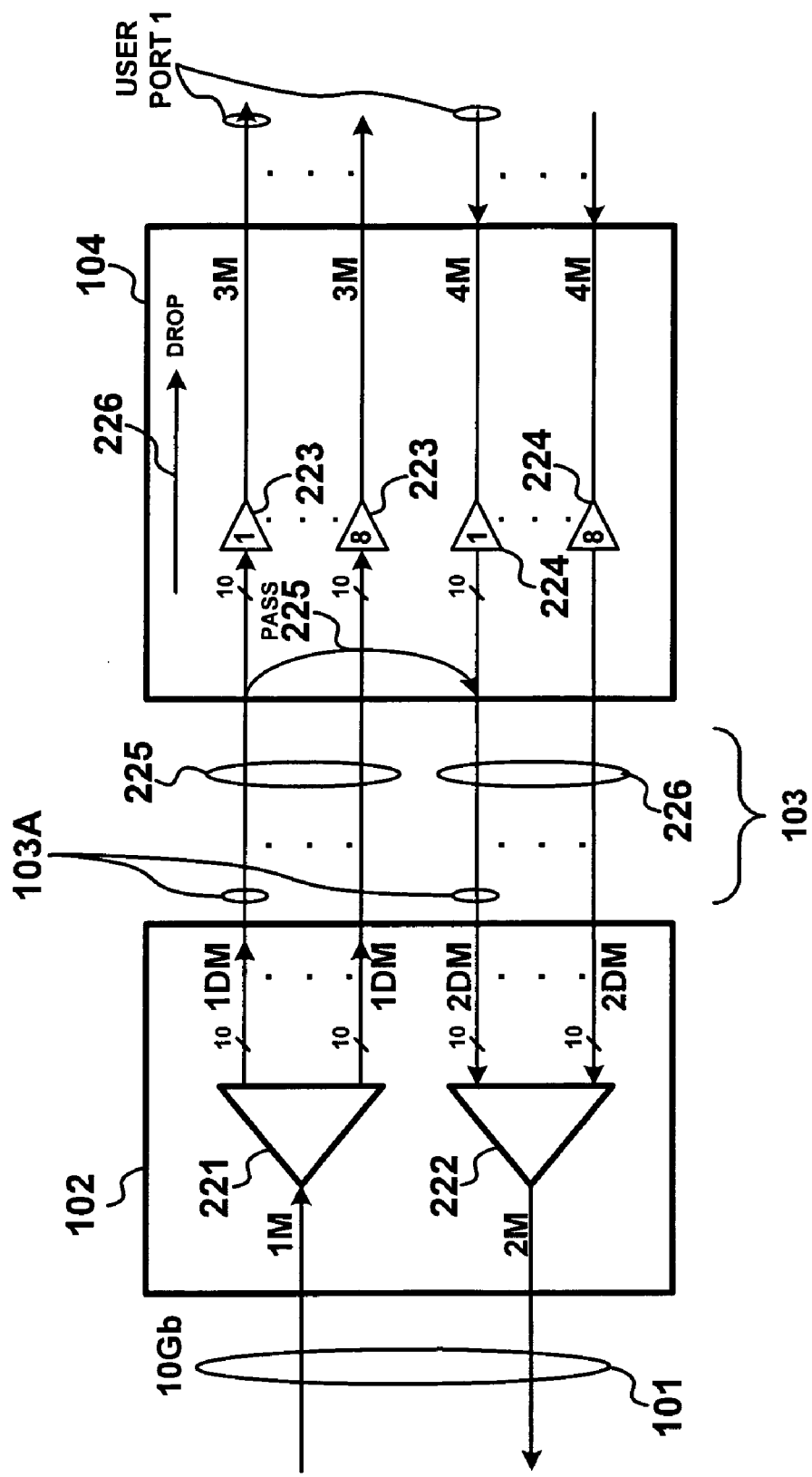
FIG. 2B shows, illustratively, the arrangement of multiplexer and demultiplexer elements which may implement the apparatus of FIG. 2A.

Shown in FIG. 2B is a simplified block diagram illustrating only the demultiplexer 221 and multiplexer 222 elements of demultiplexer/multiplexer apparatus 102 and the serializer 223 and deserializer 224 elements of the SERDES apparatus 104. Note in FIG. 2B, that all of the input 226 and output 225 buses to/from SERDES 104 are grouped together rather in input/output pairs, e.g., 103A, as shown in FIG. 2A. The serial 10 Gb input signal (also referred to as a first multiplexed signal 1M), of signal pair 101, is demultiplexed by demultiplexer 221 into a first demultiplexed signals (1DM) which appears on a 10-bit wide bus 103A. The serial 10 Gb output signal (a second multiplexed signal 2M), of signal pair 101, is formed by multiplexer 222 multiplexing the second demultiplexed signals 2DM which appears on a 10-bit wide bus. The 1DM and 2DM signals connect over buses 225 and 226 to serializer 223 and deserializer 224, respectively, of SERDES apparatus 104. Note that each of the signal pairs, e.g., 103A, shown in FIG. 2A include corresponding pairs of the 1DM and 2DM signals.

At the SERDES apparatus 104, a serializer 223 converts each of the 1DM signal into a third multiplexed signal 3M. Thus, for our example, eight serializers 223 are needed to convert the eight 1DM signals into eight 3M signals. Similarly, a deserializer 224 converts each received fourth demultiplexed signal 4M into a 2DM signal. Again for our example, eight deserializers 224 are needed to convert the eight 4M signals. Pairs of the 3M/4M signals correspond to the transmitted/received signals to/from each of the user ports 1–8 of FIG. 2B. In response to a PASS control signal on lead 201, selective one or more of the 1DM signals are looped-back to become one or more of the 2DM signals. Illustratively, the signal pair 103A shows a 1DM signal looped-back 225 to become a 2DM signal. In response to a DROP/ADD control signal on lead 201, selective one or more of the 1DM signals are dropped 226 and selective one or more of the 2DM signals are added 227. In the above manner the PASS and DROP/ADD capabilities of the reconfigureable demultiplexer/multiplexer apparatus of FIG. 2B is made operational.

Figure 3A:
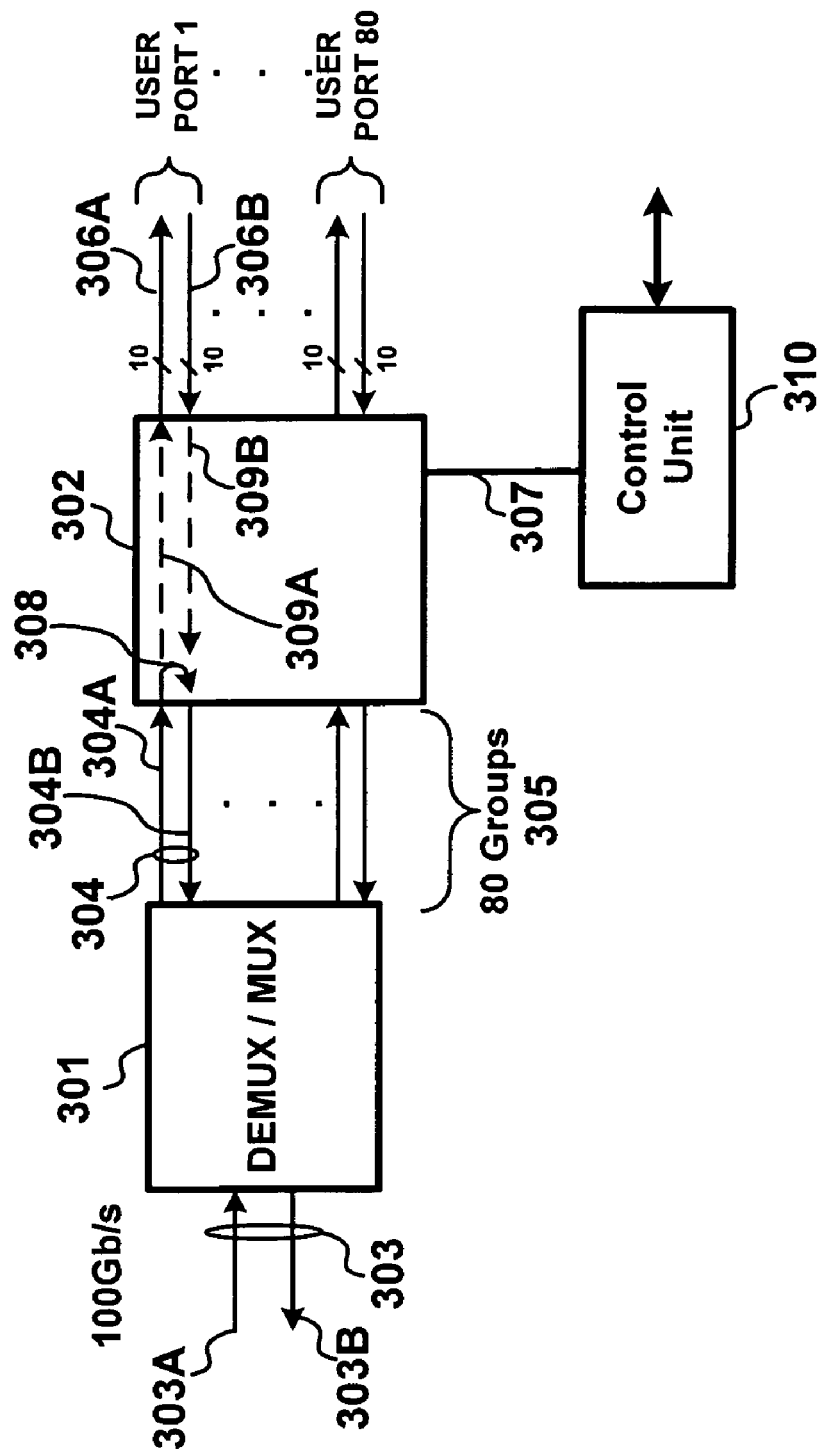
FIG. 3A shows another illustrative reconfigurable ADD/DROP multiplex/demultiplex apparatus utilizing an optical multiplexer/demultiplexer and SERDES apparatus combination.

FIG. 3A shows another implementation of our inventive reconfigurable ADD/DROP apparatus which uses only an optical multiplexer/demultiplexer 301 and SERDES apparatus 302 combination, where the serial bus loop-back functionality of the SERDES apparatus 104 is used to select the ADD/DROP and PASS channels of the reconfigurable ADD/DROP apparatus.

In this example, an illustrative 100 Gb/s signal bus pair 303 connects to a first input/output port pair of optical demultiplexer/multiplexer apparatus 301. The illustrative 100 Gb/s signal is an optical time division multiplexed (OTDM) signal. The optical demultiplexer/multiplexer apparatus 301 converts the received 100 Gb/s OTDM signal 303A into eighty demultiplexed 1.25 Gb/s signals, e.g., 304A, and multiplexes together eighty transmitted 1.25 Gb/s signals, e.g., 304B, into a 100 Gb/s OTDM transmit signal 303B. One implementation of the optical demultiplexer/multiplexer apparatus 301 will be described with reference to shown in FIG. 3B.

Figure 3B:
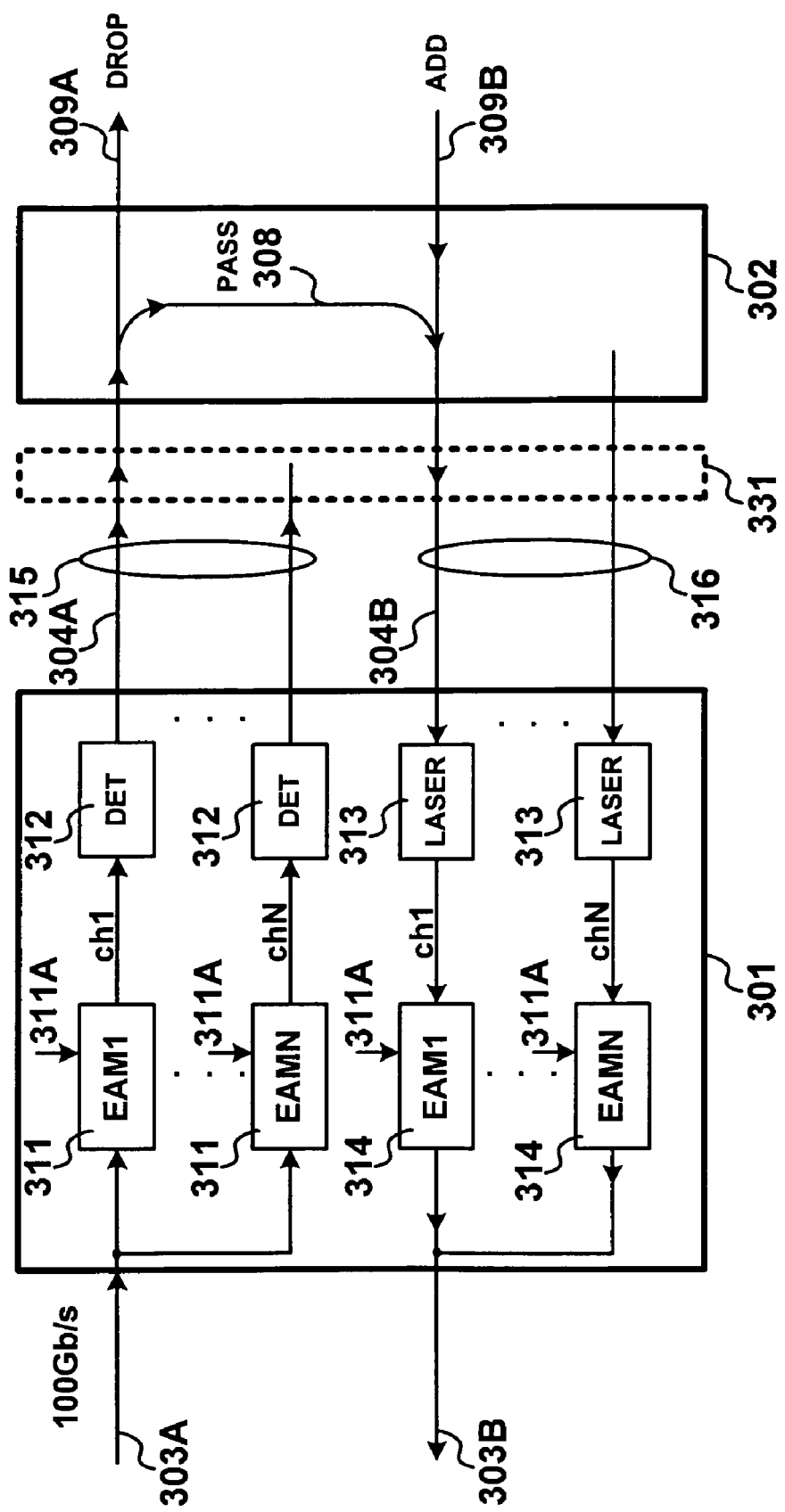
FIG. 3B shows an illustrative embodiment of an optical multiplexer/demultiplexer, which can be used in FIGS. 2 and/or 3A.

As shown in FIG. 3B the optical multiplexer/demultiplexer apparatus 301 illustratively includes a plurality of Electro-adsorption Modules (EAM) 311. Each EAM 311 is clocked at the appropriate rate (1.25 Gb/s clock signal 311A in this example) to optically demultiplex one of the eighty 1.25 Gb/s signal channels, ch1–chN, of the 100 Gb/s signal 303A and a photo detector 312 is used to detect the optical signal to produce the electrical signal 315. The SERDES apparatus 302, as will be described in a later paragraph, processes all the electrical signals 315. Illustratively for signal 304A, the SERDES apparatus 302 can DROP/ADD the signal, 309A and 309B, or can loop-back or PASS the signal, 308. Each of the electrical signals 316 from the SERDES apparatus 302 is used to modulate a laser 313 to produce an optical signal, e.g., ch1. An EAM devices 314 multiplexes the 1.25 Gb/s optical signal channels to form the 100 Gb/s signal 303B. Each EAM device 314 is clocked using the 1.25 Gb/s clock signal 311A.

Returning to FIG. 3A, the SERDES apparatus 302 connects via bus group 305 to demultiplexer/multiplexer apparatus 301. The SERDES apparatus 302 converts the serial optical signal received on each input of a 1.25 Gb/s signal bus pair, e.g., 304A, to parallel electrical signals on the ten bit wide output bus 306 and, conversely, converts the parallel electrical signals outputted on the ten bit wide input bus 306A to a serial optical 1.25 Gb/s signal on bus 304B. In addition to this bus conversion function, the SERDES apparatus 104 is used as switch fabric. Using the PASS control signal 307 the SERDES apparatus 302 operates to pass, 308, the 1.25 Gb/s signal on input bus, e.g., 304A, through to its corresponding output bus, e.g., 304B. In response to a DROP/ADD control signal 307, the SERDES apparatus 302 can selectively "drop" a received 1.25 Gb/s signal received on input bus, e.g., 304A, to user port 1 via a ten bit wide output bus 306A and "add" a new transmit signal from a ten bit wide input bus 306B from user port 1. The DROP signal is shown as 309A and the ADD signal as 309B. Again the control signal 307 is obtained from control unit 310 which may be managed locally or remotely (e.g., over separate signaling channel or over a GbE signaling channel). In this manner, the ADD/DROP apparatus of FIG. 3A is used to provide an ADD/DROP and PASS signal switching capability for each of the 1.25 Gb/s bus pairs 304 on bus group 305.

In one embodiment, the SERDES apparatus 302 is implemented using two well-known Vitesse 7139 Quad transmitter/receiver devices. Each 7139 unit includes four serializers that each receives parallel 10-bit wide GbE channels, which are serialized to form a 1.25 Gb/s (GbE) optical channel. The 7139 unit has a parallel loop-back feature that enables the independent loop-back (also referred to as PASS) control of each of the deserialized inputs (parallel 10-bit wide GbE channels). The 7139 unit also includes four deserializers that each receives a 1.25 Gb/s optical channel, which is deserialized into parallel 10-bit wide GbE channel. The 7139 unit has a serial loop-back feature that enables the independent loopback control of each of the eight serial 1.25 Gb/s (GbE) optical channels. The 7139 unit controls the serial loop-back feature by setting SLPN=high and controls the parallel loop-back feature by setting the PLUP=high. In either the serial or parallel mode, this PASS capability (or loop-back feature) of each GbE channel is controlled by setting its respective control lead LPNx=low. In either the serial or parallel mode, the ADD/DROP capability (loop-back feature disabled) of each GbE channel is controlled by setting its respective control lead LPNx=high. The SLPN, PLUP, and LPNx signals are included as part of the control signals 201 of FIGS. 2A–2B and 307 of FIGS. 3A–3C.

Note also that the 7139 unit can also be utilized as part of a reconfigurable ADD/DROP apparatus, which can handle Fiber channel optical signals. Additionally, the loop-back capability of the 7139 unit can still be used to test a link or facility between two reconfigurable ADD/DROP apparatus nodes.

With joint reference to FIGS. 2A and 3B, the optical multiplexer/demultiplexer apparatus 301 can also be used to demultiplex the 100 Gb/s optical signal 303A into eight 10 Bb/s signals 315 (using a 10 Gb/s clock signal, 311A) which can then be received and processed by SERDES apparatus 302. In this example, the 10 Bb/s signals 315 are processed by multiplexer/demultiplexer 331 (shown in dotted lines in FIG. 3B) prior to being processed by the SERDES apparatus 302. This combination of multiplexer/demultiplexer 331 and SERDES apparatus 302 is equivalent to the reconfigurable multiplexer/demultiplexer apparatus of FIG. 2A. Similarly, the eight 10 Bb/s signals 316 are multiplexed together by optical multiplexer/demultiplexer apparatus 301 to generate the 100 Gb/s optical signal 303B. Each of the EAM devices 311 and 314 is clocked using a 10 Gb/s clock signal 311A.

Figure 3C:
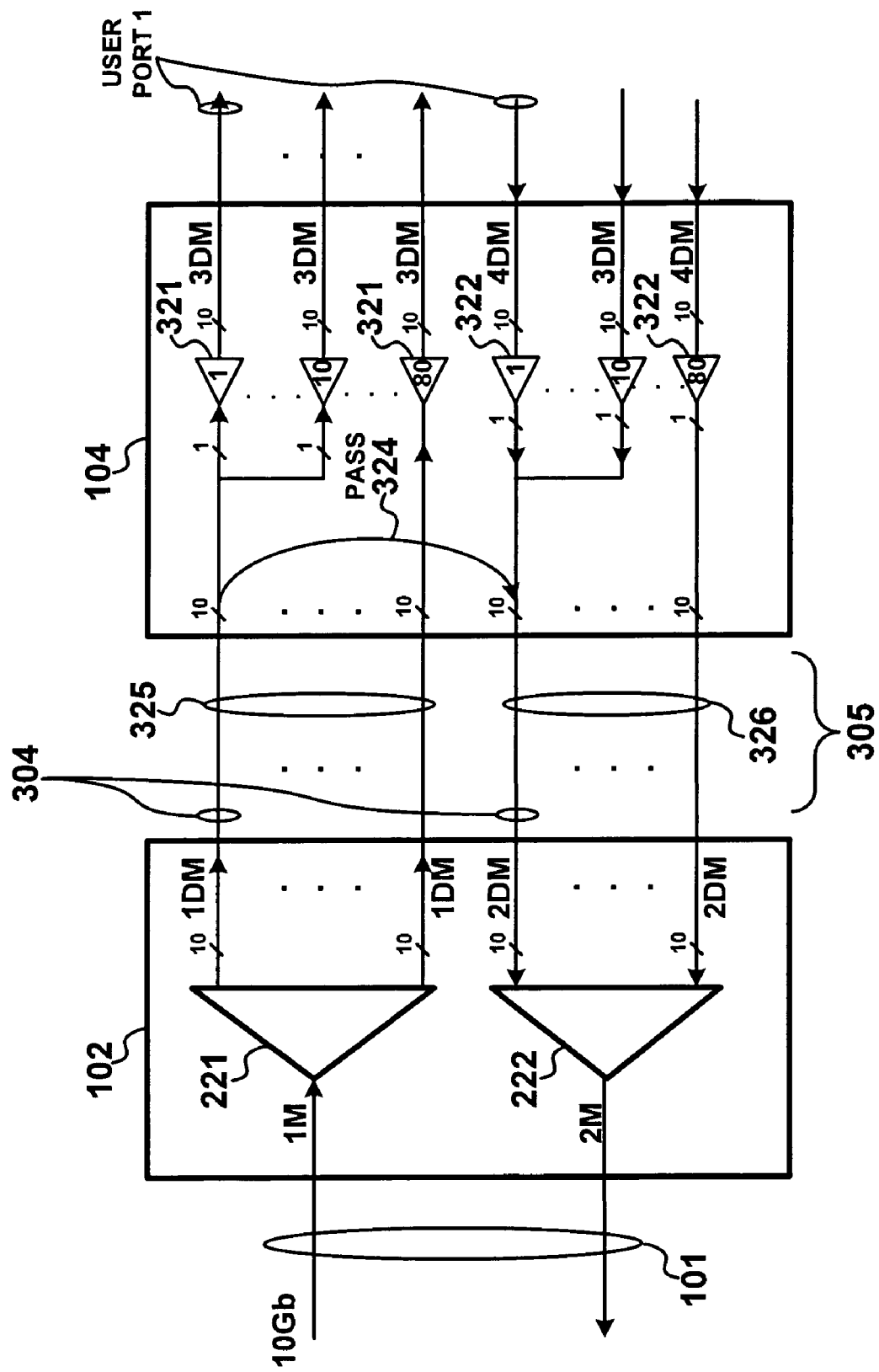
FIG. 3C shows, illustratively, the arrangement of serializers and deserializer elements, which may implement the apparatus of FIG. 3A.

Shown in FIG. 3C is a simplified block diagram illustrating only the demultiplexer 221 and multiplexer 222 elements of demultiplexer/multiplexer apparatus 102 and the serializer 223 and deserializer 224 elements of the SERDES apparatus 104. The operation description of the demultiplexer/multiplexer apparatus 102 of FIG. 3C is identical to that described for FIG. 2A. Note in FIG. 3C, that all of the input 326 and output 325 buses to/from SERDES 104 are grouped together rather in input/output pairs, e.g., 304, as shown in FIG. 3A.

At the SERDES apparatus 104, a deserializer 321 converts each 1DM signal into a third demultiplexed signal 3DM. Note that all of the 1DM signals are serial signals, i.e., they appear on one lead. Thus, for our example of FIG. 3A, eighty deserializers 321 are needed to convert the eighty 1DM signals. Similarly, eighty serializers 322 are needed to convert the received fourth demultiplexed signal 4M into the eighty 2DM signals. Pairs of 3DM/4DM signals correspond to the received/transmitted signals to/from, respectively; each of the user ports 1–80 of FIG. 3C. In response to a PASS control signal on lead 307, selective one or more of the 1DM signals are looped-back to become one or more of the 2DM signals. Illustratively, the signal pair 304 shows a 1DM signal looped-back, 324, to become a 2DM signal. In this manner the PASS capability of the reconfigureable demultiplexer/multiplexer apparatus of FIG. 3C is made operational. In response to a DROP/ADD control signal on lead 307, selective one or more of the 1DM signals are dropped and selective one or more of the 2DM signals are added. In the above manner the PASS and DROP/ADD capabilities of the reconfigureable demultiplexer/multiplexer apparatus of FIG. 3C is made operational.

Figure 4:
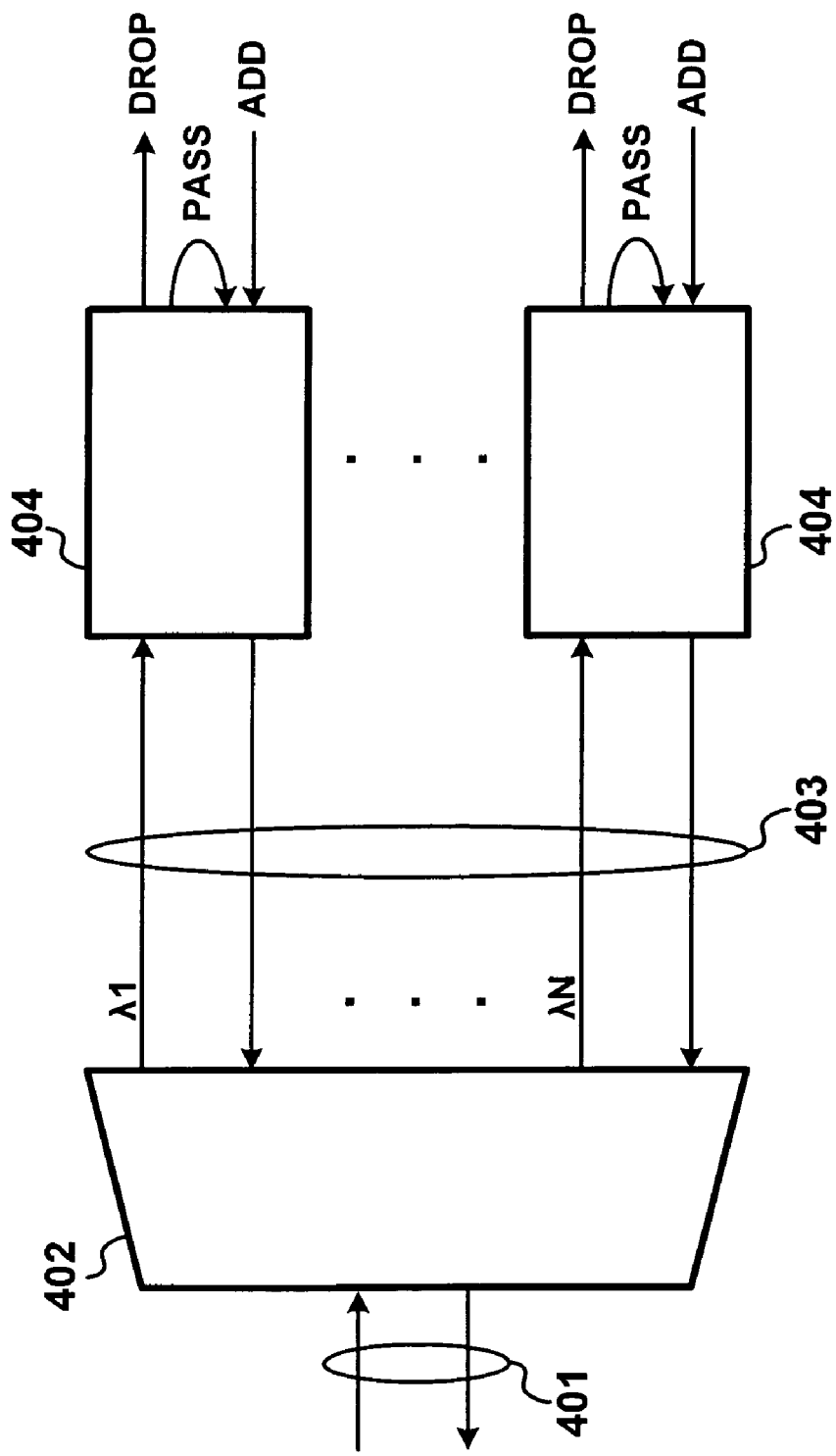
FIG. 4 shows an example of our illustrative reconfigurable ADD/DROP multiplex/demultiplex apparatus utilized at a node of a wavelength division multiplex (WDM) system.

Shown in FIG. 4 is an example of our illustrative reconfigurable ADD/DROP multiplex/demultiplex apparatus utilized at a node of a wavelength division multiplex (WDM) system. The WDM signal is received/transmitted over bus pair 401. Wavelength Demux/Mux 402 demultiplexes/multiplexes the WDM signal into its constituent wavelengths 403, i.e., λ1–λN. Each respective wavelength λ1–λN is processed by one of our reconfigurable ADD/DROP multiplex/demultiplex apparatuses 404 (of FIG. 2 or 3) to drop/add or pass one or more of the channels of that respective wavelength.

Figure 5:
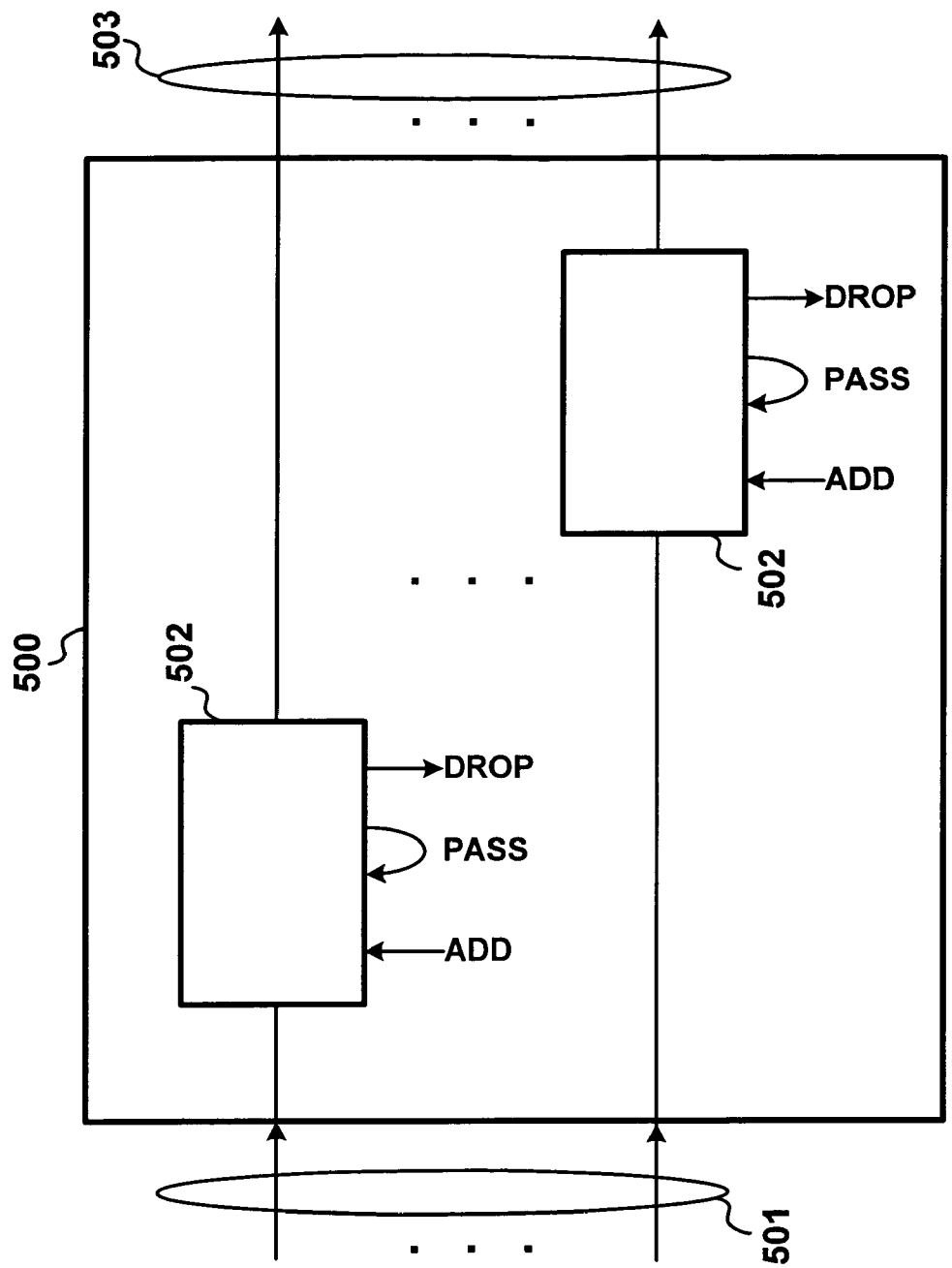
FIG. 5 shows an example of our illustrative reconfigurable ADD/DROP multiplex/demultiplex apparatus utilized at a node of a space division multiplex (SDM) system.

Shown in FIG. 5 is an example of our illustrative reconfigurable ADD/DROP multiplex/demultiplex apparatus 500 utilized at a node of a space division multiplex (SDM) system. The optical signal is received over separate optical fibers 501 and transmitted received over separate optical fibers 503. The signal on each respective optical fiber is processed by one of our reconfigurable ADD/DROP multiplex/demultiplex apparatuses 502 (of FIG. 2 or 3) to drop/add or pass one or more of the channels of the signal on that respective optical fiber.

Communication System Applications

Shown in FIG. 6 is a loop communication system including a plurality of reconfigurable ADD/DROP multiplex/demultiplex nodes 601, 603, and 605 connected over a loop facility including links 602, 604, and 606. If the system is a TDM system, each of the reconfigurable ADD/DROP nodes 601, 603, and 605 is implemented as shown in FIG. 2A.

If the system is a OTDM system, each of the reconfigurable ADD/DROP nodes 601, 603, and 605 is implemented as shown in FIG. 3A or 3B. The number of DROP/ADD channels at each of the nodes 601, 603, and 605 is shown as N, M, and P, respectively. The channel capacity of the loop facility is equal to or greater than the maximum of N, M, and P. At each node 601, 603, and 605 any channel that is not a DROP/ADD channel is a PASS channel.

If the system is a WDM system, each of the reconfigurable ADD/DROP nodes 601, 603, and 605 is implemented as shown in FIG. 4. If the system is a SDM system, each facility link 602, 604, and 606 includes multiple fibers and each of the reconfigurable ADD/DROP nodes 601, 603, and 605 is implemented as shown in FIG. 5.

We claim:

1. A reconfigurable ADD/DROP demultiplexer/multiplexer apparatus comprising
    a demultiplexer/multiplexer including
        a demultiplexer (101A) for receiving a first multiplexed signal (101A) which is demultiplexed into a first demultiplexed signal (103A) and
        a multiplexer for receiving a second demultiplexed signal (203) which is multiplexed into a second multiplexed signal (101B) and
    a serializer/deserializer apparatus including
        first converter means for receiving the first demultiplexed signal which is converted to an output signal,
        second converter means for receiving an input signal which is converted to the second demultiplexed signal, and
        reconfiguration means responsive to one or more control signals selected from a group including (1) a PASS control signal for selecting one or more signal components of the first demultiplexed signal to be looped-back to become selected one or more signal components of the second demultiplexed signal, (2) a DROP control signal for selecting one or more signal components of the first demultiplexed signal to be dropped and outputted as corresponding one or more signal components of the third multiplexed signal, and (3) an ADD control signal for selecting one or more signal components of the fourth multiplexed signal to be added as corresponding one or more signal components of the second demultiplexed signal.

2. The reconfigurable ADD/DROP demultiplexer/multiplexer apparatus of claim 1
    wherein the first converting means includes a plurality of serializers for converting the first demultiplexed signal to a third multiplexed signal which becomes the output signal and
    wherein the second converting means includes a plurality of deserializers for converting the input signal which is a fourth multiplexed signal into the second multiplexed signal.

3. The reconfigurable ADD/DROP demultiplexer/multiplexer apparatus of claim 1
    wherein the first converting means includes a plurality of deserializers for converting the first demultiplexed signal to a third demultiplexed signal which becomes the output signal and
    wherein the second converting means includes a plurality of serializers for converting the input signal which is a fourth demultiplexed signal into the second multiplexed signal.

4. A reconfigurable ADD/DROP demultiplexer/multiplexer apparatus comprising
    a demultiplexer/multiplexer including
        a demultiplexer for receiving a first multiplexed signal which is demultiplexed into a first demultiplexed signal and
        a multiplexer for receiving a second demultiplexed signal which is multiplexed into a second multiplexed signal and
    a serializer/deserializer apparatus including
        a serializer for receiving the first demultiplexed signal which is serialized into a third multiplexed signal and a deserializer for receiving a fourth multiplexed signal which is deserialized into the second demultiplexed signal, and reconfiguration means responsive to one or more control signals selected from a group including (1) a PASS control signal for selecting one or more signal components of the first demultiplexed signal which are looped-back to become selected one or more signal components of the second demultiplexed signal, (2) a DROP control signal for selecting one or more signal components of the first demultiplexed signal to be dropped and outputted as corresponding one or more signal components of the third multiplexed signal, and (3) an ADD control signal for selecting one or more signal components of the fourth multiplexed signal to be added as corresponding one or more signal components of the second demultiplexed signal.

5. The reconfigurable ADD/DROP demultiplexer/multiplexer apparatus of claim 4 wherein the first multiplexed signal is a time-division multiplexed, TDM, signal.

6. The reconfigurable ADD/DROP demultiplexer/multiplexer apparatus of claim 4 wherein the first multiplexed signal is an optical time-division multiplexed, OTDM, signal.

7. The reconfigurable ADD/DROP demultiplexer/multiplexer apparatus of claim 4 wherein the first multiplexed signal is a wavelength-division multiplexed, WDM, signal.

8. A reconfigurable ADD/DROP demultiplexer/multiplexer apparatus comprising
a demultiplexer/multiplexer including
a demultiplexer for receiving a first multiplexed signal which is demultiplexed into a first demultiplexed signal and
a multiplexer for receiving a second demultiplexed signal which is multiplexed into a second multiplexed signal and
a serializer/deserializer apparatus including
a deserializer for receiving the first demultiplexed signal which is deserialized into a third demultiplexed signal and
a serializer for receiving a fourth demultiplexed signal which is serialized into the second demultiplexed signal, and
reconfiguration means responsive to one or more control signals selected from a group including (1) a PASS control signal for selecting one or more signal components of the first demultiplexed signal to be looped-back to become selected one or more signal components of the second demultiplexed signal, (2) a DROP control signal for selecting one or more signal components of the first demultiplexed signal to be dropped and outputted as corresponding one or more signal components of the third multiplexed signal, and (3) an ADD control signal for selecting one or more signal components of the fourth multiplexed signal to be added as corresponding one or more signal components of the second demultiplexed signal.

9. The reconfigurable ADD/DROP demultiplexer/multiplexer apparatus of claim 8 wherein the first multiplexed signal is a wave division multiplexed, WDM, signal.

10. The reconfigurable ADD/DROP demultiplexer/multiplexer apparatus of claim 8 wherein the first multiplexed signal is an optical time division multiplexed, OTDM, signal.

11. A method of operating a reconfigurable ADD/DROP demultiplexer/multiplexer apparatus comprising the steps of:
at a demultiplexer/multiplexer
demultiplexing a first multiplexed signal into a first demultiplexed signal and
multiplexing a second demultiplexed signal into a second multiplexed signal and
at a serializer/deserializer apparatus
converting the first demultiplexed signal into an output signal,
converting an input signal into the second demultiplexed signal, and wherein
the serializer/deserializer apparatus is responsive to one or more control signals selected from a group including (1) a PASS control signal selecting one or more signal components of the first demultiplexed signal which are looped-back as one or more components of the second demultiplexed signal, (2) a DROP control signal selecting one or more signal components of the first demultiplexed signal to be dropped and outputted as corresponding one or more signal components of the third multiplexed signal, and (3) an ADD control signal selecting one or more signal components of the fourth multiplexed signal to be added as corresponding one or more signal components of the second demultiplexed signal.

12. The method of claim 11 wherein the output signal is a third multiplexed signal and the input signal is a fourth multiplexed.

13. The method of claim 11 wherein the output signal is a third demultiplexed signal and the input signal is a fourth demultiplexed.

* * * * *